United States Patent
Sun et al.

(10) Patent No.: US 9,553,313 B2
(45) Date of Patent: *Jan. 24, 2017

(54) 3V CLASS SPINEL COMPLEX OXIDES AS CATHODE ACTIVE MATERIALS FOR LITHIUM SECONDARY BATTERIES, METHOD FOR PREPARING THE SAME BY CARBONATE COPRECIPITATION, AND LITHIUM SECONDARY BATTERIES USING THE SAME

(71) Applicant: IUCF-HYU (INDUSTRY-UNIVERSITY COOPERATION FOUNDATION HANYANG UNIVERSITY), Seoul (KR)

(72) Inventors: Yang Kook Sun, Seoul (KR); Sang Ho Park, Seoul (KR); Sung Woo Oh, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 91 days.

This patent is subject to a terminal disclaimer.

(21) Appl. No.: 14/525,687

(22) Filed: Oct. 28, 2014

(65) Prior Publication Data

US 2015/0041710 A1 Feb. 12, 2015

Related U.S. Application Data

(62) Division of application No. 11/883,508, filed as application No. PCT/KR2005/003195 on Sep. 27, 2005, now Pat. No. 8,956,759.

(30) Foreign Application Priority Data

Feb. 2, 2005 (KR) ........................ 10-2005-0009582

(51) Int. Cl.
*H01M 4/505* (2010.01)
*H01M 4/58* (2010.01)
(Continued)

(52) U.S. Cl.
CPC ................ *H01M 4/58* (2013.01); *B82Y 30/00* (2013.01); *C01D 15/02* (2013.01);
(Continued)

(58) Field of Classification Search
CPC ... C01D 15/02; C01G 45/1242; C01G 53/006; C01G 53/54; C01P 2002/32; C01P 2002/52; C01P 2002/54; C01P 2002/72; C01P 2004/03; C01P 2004/32; C01P 2004/50; C01P 2004/61; C01P 2004/64; C01P 2006/11; C01P 2006/40; H01M 4/505; H01M 4/525; H01M 4/58; H01M 4/5815

See application file for complete search history.

(56) References Cited

U.S. PATENT DOCUMENTS

| 5,135,732 A | 8/1992 | Barboux et al. |
| 5,738,957 A | 4/1998 | Amine et al. |

(Continued)

FOREIGN PATENT DOCUMENTS

| JP | 05-013107 A | 1/1993 |
| JP | 08-298115 A | 11/1996 |

(Continued)

OTHER PUBLICATIONS

Amine et al., "A New Three-Volt Spinel Li1+xMn1,5Ni0,5O4 for Secondary Lithium Batteries", Journal of the Electrochemical Society, vol. 143, No. 5, May 1996, pp. 1607-1613.

(Continued)

*Primary Examiner* — Carlos Barcena
(74) *Attorney, Agent, or Firm* — Tutunjian & Bitetto, P.C.

(57) ABSTRACT

Disclosed herein is a 3V class spinel oxide with improved high-rate characteristics which has the composition $Li_{1+x}[M_yMn_{(2-y)}]O_{4-z}S_z$ ($0 \leq x \leq 0.1$, $0.01 \leq y \leq 0.5$, $0.01 \leq z \leq 0.5$, and M is Mn, Ni or Mg). Further disclosed is a method for preparing the 3V class spinel oxide by carbonate coprecipitation of starting materials, addition of sulfur, followed by calcining. The 3V class spinel oxide is spherical and has a uniform size distribution. A lithium secondary battery including the 3V class spinel oxide has a constant plateau at a potential of 3V and shows superior cycle characteristics.

8 Claims, 7 Drawing Sheets

(51) Int. Cl.
*B82Y 30/00* (2011.01)
*C01G 45/12* (2006.01)
*C01G 53/00* (2006.01)
*H01M 4/525* (2010.01)
*C01D 15/02* (2006.01)

(52) U.S. Cl.
CPC ....... *C01G 45/1242* (2013.01); *C01G 53/006* (2013.01); *C01G 53/54* (2013.01); *H01M 4/505* (2013.01); *H01M 4/525* (2013.01); *H01M 4/5815* (2013.01); *C01P 2002/32* (2013.01); *C01P 2002/52* (2013.01); *C01P 2002/54* (2013.01); *C01P 2002/72* (2013.01); *C01P 2004/03* (2013.01); *C01P 2004/32* (2013.01); *C01P 2004/50* (2013.01); *C01P 2004/61* (2013.01); *C01P 2004/64* (2013.01); *C01P 2006/11* (2013.01); *C01P 2006/40* (2013.01); *Y02E 60/122* (2013.01); *Y02P 70/54* (2015.11)

(56) References Cited

U.S. PATENT DOCUMENTS

| | | |
|---|---|---|
| 6,103,422 A | 8/2000 | Kanai |
| 6,334,993 B1 | 1/2002 | Suita et al. |
| 6,361,755 B1 | 3/2002 | Manthiram et al. |
| 6,677,081 B2 | 1/2004 | Sunagawa et al. |

FOREIGN PATENT DOCUMENTS

| | | |
|---|---|---|
| JP | 10-177859 A | 6/1998 |
| JP | 2006-180937 A | 7/2001 |
| JP | 2001-302248 A | 10/2001 |
| JP | 2002-63900 A | 2/2002 |
| JP | 2002-104827 A | 4/2002 |
| JP | 2002-134110 A | 5/2002 |
| JP | 2003-081637 A | 3/2003 |
| JP | 2003-157844 A | 5/2003 |
| JP | 2003-203632 A | 7/2003 |
| JP | 2004-227790 A | 8/2004 |
| JP | 2004-303710 A | 10/2004 |
| JP | 2004-349109 A | 12/2004 |
| KR | 2001-63879 A | 7/2001 |
| KR | 2004-7356 A | 1/2004 |

OTHER PUBLICATIONS

Park et al., "Synthesis and electrochemical characterization of Li1.02Mg0.1Mn1.9O3.99S0.01 using sol-gel method", Journal of Power Sources, vol. 92, 2001, pp. 244-249.

Tarascon et al., "The Spinel Phase of LiMn2O4 as a Cathode in Secondary Lithium Cells", Journal of the Electrochemical Society, vol. 138, No. 10, Oct. 1991, pp. 2859-2864.

3V CLASS SPINEL COMPLEX OXIDES AS CATHODE ACTIVE MATERIALS FOR LITHIUM SECONDARY BATTERIES, METHOD FOR PREPARING THE SAME BY CARBONATE COPRECIPITATION, AND LITHIUM SECONDARY BATTERIES USING THE SAME

CROSS-REFERENCE TO RELATED APPLICATIONS

This is a division of application Ser. No. 11/883,508 having a filing/371(c) date of Jun. 26, 2008 which is the U.S. National Stage application of PCT/KR2005/003195 filed on Sep. 27, 2005, which claims priority from Korean Application KR 10-2005-0009582 filed on Feb. 2, 2005, the disclosure of which is incorporated herein by reference.

TECHNICAL FIELD

The present invention relates to cathode active materials for lithium secondary batteries. More particularly, the present invention relates to 3V class spinel oxides having the composition $Li_{1+x}[M_yMn_{(2-y)}]O_{4-z}S_z$ ($0 \le x \le 0.1$, $0.01 \le y \le 0.5$, $0.01 \le z \le 0.5$, and M is Mn, Ni or Mg), a method for preparing the spinel oxides, and 3V class lithium secondary batteries comprising the spinel oxides.

BACKGROUND ART

In recent years, demand for rechargeable lithium ion secondary batteries as power sources of portable electronic devices for digital communication, such as cell phones, personal digital assistants (PDAs) and notebooks, portable electronic devices, such as digital cameras, camcorders and MP3 players, and electric vehicles, has increased exponentially. The performance of these devices is particularly influenced by secondary batteries as important components of the devices. Accordingly, there is a strong need for high-performance batteries.

With the recent rapid development of electronic device technologies, device products have become increasingly compact and lightweight and their driving voltage has been lowered. Most commercially available lithium secondary batteries are limited to 4V class. Under these circumstances, there is an urgent need for the development of 3V class batteries necessary to drive electronic devices at low voltages.

On the other hand, cathode active materials compose the largest portion of the price of materials for lithium secondary batteries. Cathode active materials are most generally prepared by a solid-state reaction process. According to the solid-state reaction process, cathode active materials are prepared by mixing carbonates and hydroxides of respective constituent elements as starting materials, firing the mixture, and repeating the procedure. Disadvantages of the solid-state reaction process are that solid phase materials are difficult to form into a solid solution, large quantities of impurities are introduced during mixing, control over the size of particles to a constant level is difficult, and high temperature and long preparation time are involved. In contrast, carbonate coprecipitation, which is a process wherein constituent elements can be controlled to an atomic range, enables preparation of starting materials of cathode active materials for lithium secondary batteries, advantageously leading to preparation of spherical metal complex carbonates.

Current research on the development of spinel oxides has concentrated on $LiM_xMn_{(2-x)}O_4$ in which 4V class $LiMn_2O_4$ and Mn are partly replaced with a transition metal. The spinel oxide $LiM_xMn_{(2-x)}O_4$ can be utilized even in the 5V region. However, the development of cathode active materials for 3V class lithium secondary batteries has a limitation because of the structural transition (Jahn-Teller distortion) due to $Mn^{3+}$. 3V class cathode active materials for lithium secondary batteries are currently being developed in the form of spinel oxides and layered $Li_xMnO_2$. However, the layered $Li_xMnO_2$ disadvantageously undergoes sudden transition into a spinel phase as the charge/discharge cycles are proceeded. Further, Japanese Patent Laid-open Nos. 2001-180937 and 2000-243339 report $Li_4Mn_5O_{12}$ as a spinel oxide. However, the $^{amount}$ of oxygen must be controlled in an inert atmosphere or under vacuum to prepare the spinel oxide, and preparation variables are complicated, causing some problems in reproducibility. Further, U.S. Pat. No. 6,361,755B1 reports low-temperature preparation of $Li_4Mn_5O_{12}$. This preparation, however, requires a long time ranging from one to five days. Further, U.S. Pat. No. 5,135,732 reports the preparation of $LiMn_2O_4$ at a temperature below 400° C. and the electrochemical properties in the potential region of 2.4V~3.5V. However, batteries using the material show poor cycle characteristics, making it unsuitable for practical use.

SUMMARY OF THE INVENTION

Technical Problem

It is one object of the present invention to provide a method for preparing a spinel oxide having the composition $Li_{1+x}[M_yMn_{(2-y)}]O_{4-z}S_z$ ($0 \le x \le 0.1$, $0.01 \le y \le 0.5$, $0.01 \le z \le 0.5$, and M is Mn, Ni or Mg), as a cathode active material for lithium secondary batteries.

It is another object of the present invention to provide a lithium secondary battery with a constant plateau at a potential of 3V, superior cycle characteristics and excellent high-rate discharge characteristics, comprising the 3V class spinel oxide.

Technical solution

In accordance with one aspect of the present invention for achieving the above objects, there is provided a 3V class spinel oxide having the composition $Li_{1+x}[M_yMn_{(2-y)}]O_4$ ($0 \le x \le 0.1$, $0.01 \le y \le 0.5$, and M is Mn, Ni or Mg) as a cathode active material for a lithium secondary battery.

In accordance with another aspect of the present invention, there is provided a 3V class spinel oxide having the composition $Li_{1+x}[M_yMn_{(2-y)}]O_{4-z}S_z$ ($0 \le x \le 0.1$, $0.01 \le y \le 0.5$, $0.01 \le z \le 0.5$, and M is Mn, Ni or Mg) containing sulfur (S) as a cathode active material for a lithium secondary battery.

Preferably, the 3V class spinel oxide is composed of spherical secondary particles having a particle diameter of 5~20 μm obtained from aggregation of primary particles having a particle diameter of 10~50 nm.

In accordance with another aspect of the present invention, there is provided a 3V class lithium secondary battery comprising the 3V class spinel oxide.

In accordance with another aspect of the present invention, there is provided a method for preparing the 3V class spinel oxide by feeding distilled water purged with carbonic acid gas, an aqueous solution containing at least one transition metal other than Mn as a central metal, an aqueous ammonia solution and a carbonate solution into a reactor to prepare a transition metal complex carbonate by carbonate coprecipitation, primarily calcining the transition metal complex carbonate to prepare a transition metal complex oxide, and adding an excess of a lithium salt with respect to the stoichiometric ratio of the transition metal complex oxide, followed by secondary calcining, to prepare $Li_{1+x}[M_yMn_{(2-y)}]O_{4-z}S_z$ ($0 \leq x \leq 0.1$, $0.01 \leq y \leq 0.5$, $0.01 \leq z \leq 0.5$, and M is Mn, Ni or Mg).

Preferably, the transition metal is selected from the group consisting of Ni, Mg, Ti, V, Cr, Fe, Co, Cu, Zn, Al, Ga, Rb, Ge, Mo, Nb, Zr, Si, and combinations thereof.

Preferably, the transition metal is in the form of a metal salt selected from nitrates, sulfates, phosphates and chlorides of the transition metal.

Preferably, the primary calcining of the transition metal complex carbonate and the secondary calcining of the transition metal complex oxide are performed at between 500° C. and 800° C.

Preferably, the carbonate solution is selected from sodium carbonate, ammonium hydrogen carbonate, ammonium carbonate, and sodium hydrogen carbonate solutions.

Preferably, the mixed solution has an acidity (pH) between 4 and 13.

In accordance with yet another aspect of the present invention, there is provided a method for preparing the 3V class spinel oxide by adding 0.01~0.5 moles of sulfur per mole of the transition metal complex oxide, followed by secondary calcining.

Advantageous Effects

The spinel oxide of the present invention is spherical and has a uniform particle size. In addition, batteries using the spinel oxide as a cathode active material have a constant plateau at a potential of 3V and show superior cycle characteristics. Furthermore, the active material containing sulfur according to the present invention advantageously shows high-capacity characteristics and superior high-rate characteristics.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Hereinafter, the present invention will be explained in more detail. The present invention provides a cathode active material for use in a lithium secondary battery. Specifically, the present invention provides a 3V class spinel oxide having the composition $Li_{1+x}[M_yMn_{(2-y)}]O_4$ ($0 \leq x \leq 0.1$, $0.01 \leq y \leq 0.5$, and M is Mn, Ni or Mg) prepared by feeding distilled water purged with carbonic acid gas, an aqueous solution containing at least one transition metal other than Mn as a central metal, an aqueous ammonia solution and a carbonate solution into a reactor to prepare a transition metal complex carbonate by carbonate coprecipitation, calcining the transition metal complex carbonate, adding a lithium salt thereto, and calcining the mixture.

Since the nano-sized primary particles having the composition prepared by carbonate coprecipitation and spherical secondary particles composed of the primary particles decrease the phase transition from a cubic spinel structure to a tetragonal structure during intercalation/deintercalation of lithium, a lithium secondary battery fabricated using the particles has a constant potential plateau in the 3V region and shows superior cycle characteristics.

The 3V class spinel oxide of the present invention is composed of spherical secondary particles having a particle diameter of 5~20 μm obtained from aggregation of primary particles having a particle diameter of 10~50 nm. The control of the average diameter of the primary particles to 10~50 nm increases the diffusion rate of lithium ions, thus markedly improving the high-rate discharge characteristics of the final lithium secondary battery. On the other hand, the control of the average diameter of the secondary particles to 5~20 μm and preferably 10 μm increases the filling degree and coatability of the lithium complex oxide, thus allowing the electrode to have a high capacity.

The 3V class spinel oxide of the present invention may further comprise 0.01~0.5 mole % of sulfur (S) as a replacing element. This addition of sulfur improves high-capacity characteristics, cycle characteristics and high-rate discharge characteristics of the final lithium secondary battery.

The present invention provides a method for preparing the 3V class spinel oxide by feeding distilled water purged with carbonic acid gas, an aqueous solution containing at least one transition metal other than Mn as a central metal, an aqueous ammonia solution and a carbonate solution into a reactor to prepare a transition metal complex carbonate by carbonate coprecipitation, primarily calcining the transition metal complex carbonate to prepare a transition metal complex oxide, and adding an excess of a lithium salt with respect to the stoichiometric ratio of the transition metal complex oxide, followed by secondary calcining, to prepare $Li_{1+x}[M_yMn_{(2-y)}]O_{4-z}S_z$ ($0 \leq x \leq 0.1$, $0.01 \leq y \leq 0.5$, $0.01 \leq z \leq 0.5$, and M is Mn, Ni or Mg).

Figure 1:
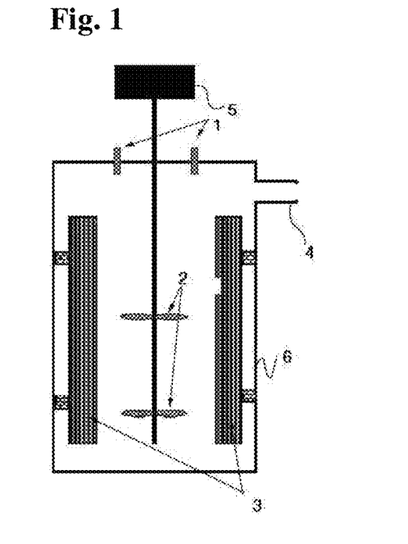
FIG. 1 is a cross-sectional view showing the structure of a reactor used in a method of the present invention.

In the method of the present invention, an aqueous complex solution containing at least two transition metals, an aqueous ammonia solution and a carbonate solution are fed into a reactor while carbonic acid gas are purged at a flow rate of 1 L/min. into the reactor. For example, the reaction mechanism for the synthesis of $(Ni_{0.25}Mn_{7.5})CO_3$ is depicted below:

$Ni^{2+}(aq.) + Mn^{2+}(aq.) + xNH_3^{2+} \rightarrow [NiMn(NH_3)_n^{2+}]$
$(aq.) + (x-n)NH_3^{2+}(aq.) \ [NiMn(NH_3)_n^{2+}](aq.) +$
$yCO_3^{2-} + zH_2O \rightarrow [NiMn]CO_3(s) + nNH_3^{2+}$ FIG. 1 is a cross-sectional view of the reactor usable in the method of the present invention. As shown in FIG. 1, the reactor includes a motor 5, reverse-type rotating blades 2 connected to the motor 5, and one to three baffles spaced 2~3 cm apart from the inner wall of the reactor. The reverse-type design of the rotating blades allows uniform mixing of the starting materials supplied through feeding ports 1 at the upper and lower portions of the reactor, and the spacing of the baffles from the inner wall of the reactor enables control of the flow rate and concentration of the starting materials and enhances the turbulence effects, thus solving local non-uniformity problems of the reaction solution.

The use of the reactor in the method of the present invention improves the tap density of the carbonate by about 10% or more, compared to the use of conventional reactors. The tap density of the carbonate is preferably 1.6 g/cm³, particularly 1.8 g/cm³ or more, and more preferably 2.0 g/cm³. The average residence time of the mixed solution in the reactor is preferably controlled to 5~20 hours. After the reaction reaches a steady state, spherical nickel-manganese complex carbonate particles can be continuously collected through an overflow pipe 4.

According to the method of the present invention, a 3V class spinel oxide can be prepared by feeding at least two transition metals, an aqueous ammonia solution, an aqueous carbonate solution and carbonic acid gas into a reactor, reacting the mixed solution with stirring to obtain a precipitate of a metal complex carbonate, primarily calcining the precipitate to prepare a metal complex oxide, and adding a lithium salt to the metal complex oxide, followed by secondary calcining.

Unlike conventional batch type processes wherein ammonia water and ammonium carbonate are mixed in a metal solution to obtain a precipitate, simultaneous feeding of an aqueous solution of at least two transition metals, an aqueous ammonia solution, an aqueous carbonate solution and carbonic acid gas into a reactor in the method of the present invention prevents initial oxidation of the metal ions, thereby achieving uniformity of the particles and continuously obtaining a precipitate in which the metal elements are uniformly distributed.

The carbonate solution can be selected from sodium carbonate, ammonium hydrogen carbonate, ammonium carbonate, and sodium hydrogen carbonate solutions.

The carbonic acid gas can be supplied to the reactor by purging. This purging has advantages that oxidation of the carbonate salt is prevented and the concentration of $CO_3^{2+}$ ions contained in the mixed solution is increased, thus replenishing the amount of the carbonate salt that may run short during reaction.

The transition metal can be selected from the group consisting of Ni, Mg, Ti, V, Cr, Fe, Co, Cu, Zn, Al, Ga, Rb, Ge, Mo, Nb, Zr, Si, and combinations thereof. More preferably, there can be used a metal salt containing the transition metal and one element of lithium, manganese and sulfur.

The primary calcining of the transition metal complex carbonate and the secondary calcining of the transition metal complex oxide can be performed at between 500° C. and 800° C. When the calcining temperature is lower than 500° C., the crystallinity of the final spinel oxide is poor. In the case of the spinel oxide partly replaced with sulfur, the amount of impurities is undesirably increased. Meanwhile, when the calcining temperature exceeds 800° C., the crystallinity increases and thus the capacity of the final lithium secondary battery is unfavorably reduced to 3V or less.

The mixed solution may further contain a chelating agent. Specifically, the chelating agent can be selected from the group consisting of citric acid, tartaric acid, urea, formic acid, glycolic acid, polyacrylic acid, adipic acid, and glycine.

The acidity (pH) of the mixed solution is preferably adjusted to 4~13.

In the method of the present invention, sulfur can be further added to the transition metal complex oxide before the secondary calcining. At this time, the molar ratio of the sulfur to the transition metal complex oxide is between 0.01~0.5:1. Such partial replacement with sulfur helps to remove NiO impurities at 15° (2θ) and allows the spinel oxide powder to have a spinel cubic structure belonging to the space group Fd-3m.

The following non-limiting examples illustrate are provided to illustrate a method for preparing 3V class spinel oxides according to the present invention.

EXAMPLE 1

Two liters of distilled water was put in a reactor (capacity: 4 L, rotation speed of motor: 1,000 rpm or more), and then carbonic acid gas was purged into the reactor while bubbling at a rate of one liter/minute so as to be dissolved in the distilled water, thereby removing dissolved oxygen and replenishing carbonate ions. Stirring was conducted at 1,000 rpm while keeping the temperature of the reactor at 60° C.

Eight liters of a 2M aqueous metal solution containing nickel sulfate and manganese sulfate in a molar ratio of 0.25:0.75 and eight liters of a 0.2M aqueous ammonia solution were continuously fed into the reactor at rates of 0.5 and 0.67 liters/hour, respectively. Eight liters of a 2M aqueous sodium carbonate solution was fed into the reactor to adjust the pH to 7.5.

At this time, the rotation speed of an impeller was set to 1,000 rpm. The flow rate of the solution was controlled so that the average residence time in the reactor was about 3 hours. After the reaction reached a steady state, a spherical nickel-manganese complex carbonate was continuously collected through an overflow pipe. The metal complex carbonate was filtered, washed with water, dried in a hot-air dryer at 110° C. for 12 hours, followed by primary calcining at 500° C. for 5 hours, to obtain a precursor in the form of a metal complex oxide.

The precursor was mixed with lithium hydroxide in a molar ratio of 1:1.06, heated at a rate of 1° C./min., followed by secondary calcining at 500° C. for 5 hours, to obtain the spinel oxide $Li_{1.06}Ni_{0.5}Mn_{1.5}O_4$.

Figure 2:
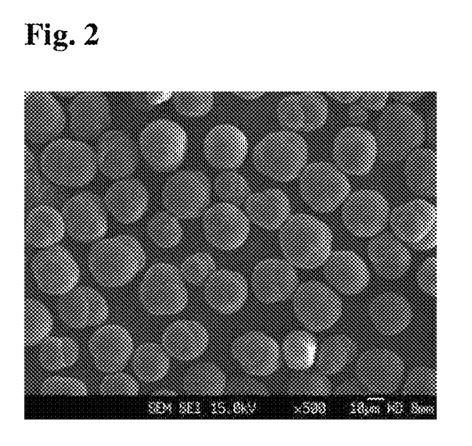
FIG. 2 is a scanning electron microscopy (SEM) image of a 3V class spinel oxide prepared in Example 1.

FIG. 2 is a field emission-scanning electron microscopy (FE-SEM) image of the spinel oxide obtained after the metal complex carbonate was annealed at 500° C. The spinel oxide powder was spherical, and had an average particle diameter of 10 μm, a uniform size distribution and a tap density of 1.5~2.0 g/cm$^3$. The surface image indicates that the spinel oxide was composed of fine powder having a size of about 50 nm or less.

Figure 4:
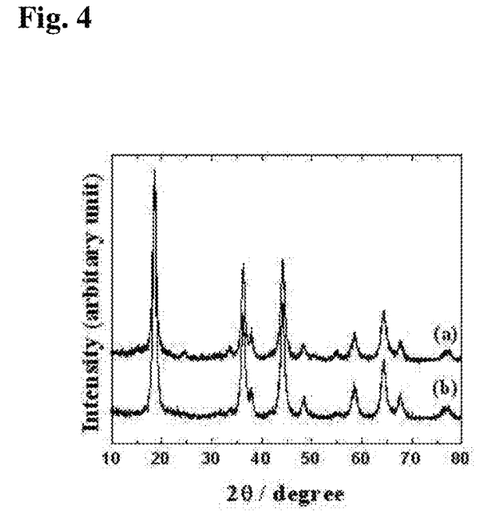
FIG. 4 shows X-ray diffraction patterns of spinel oxides prepared in Examples 1 and 3.

FIG. 4a shows X-ray diffraction patterns of the sintered spinel oxide powder. From the patterns of the sintered powder at a high temperature of 800° C., it was confirmed that NiO impurities are present at 15° (2θ) and the powder has a spinel cubic structure belonging to the space group Fd-3m.

EXAMPLE 2

The spinel oxide $Li_{1.06}Ni_{0.5}Mn_{1.5}O_4$ was prepared in the same manner as in Example 1, except that the precursor and lithium hydroxide were mixed in a molar ratio of 1:1.06, heated at a rate of 1° C./min., followed by secondary calcining at 800° C. for 5 hours.

EXAMPLE 3

The spinel oxide $Li_{0.6}[Ni_{0.5}Mn_{1.5}]O_{3.95}S_{0.05}$ powder was prepared in the same manner as in Example 1, except that the precursor in the form of a metal complex oxide, lithium hydroxide and sulfur were mixed in a molar ratio of 1:1.06: 0.05, heated at a rate of 1° C./min., followed by secondary calcining at 500° C. for 5 hours. A cathode for a lithium secondary battery was produced using the spinel oxide, and a coin-type battery comprising the cathode was fabricated.

Figure 3:
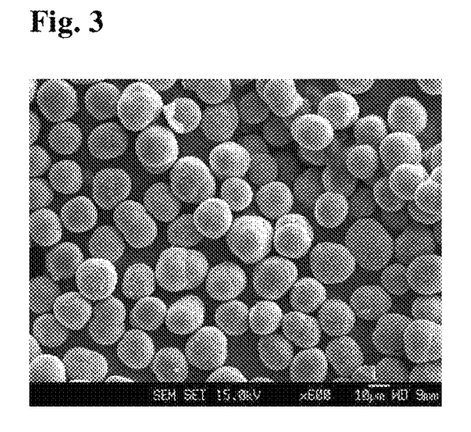
FIG. 3 is a scanning electron microscopy (SEM) image of a 3V class spinel oxide prepared in Example 3.

FIG. 3 is a FE-SEM image of the spinel oxide ($Li_{1.06}[Ni_{0.5}Mn_{1.5}]O_{4-y}S_y$ (y=0.05)) obtained after secondary calcining at 500° C.

FIG. 4b shows X-ray diffraction patterns of the lithium complex oxide powder partly replaced with sulfur. From the patterns of the lithium complex oxide powder, it was confirmed that NiO impurities are present at 15° (2θ) and the powder has a spinel cubic structure belonging to the space group Fd-3m.

EXAMPLE 4

The spinel oxide $Li_{1.06}[Ni_{0.5}Mn_{1.5}]O_{3.95}S_{0.05}$ powder was prepared in the same manner as in Example 3, except that the precursor in the form of a metal complex oxide, lithium hydroxide and sulfur were mixed in a molar ratio of 1:1.06: 0.05, heated at a rate of 1° C./min., followed by secondary calcining at 800° C. for 5 hours.

Experiment 1 (Evaluation of Characteristics of Spinel Oxides)

Figure 8:
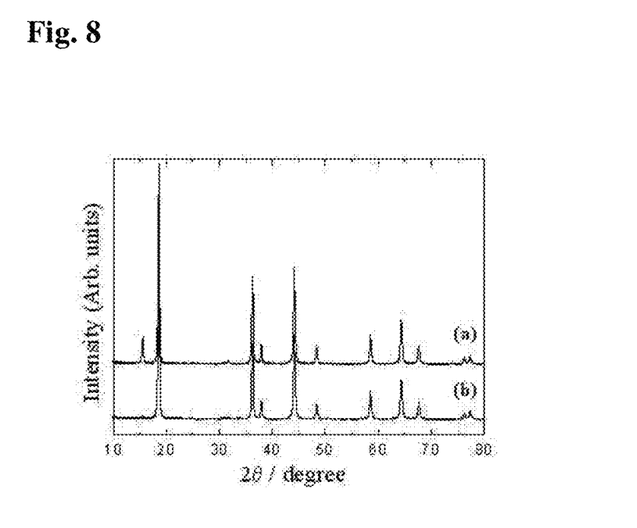
FIG. 8 shows X-ray diffraction patterns of spinel oxides prepared in Examples 2 and 4.

SEM and XRD images were taken to evaluate the characteristics of the spinel oxides prepared in Examples 1 to 4.
(1) SEM
FIG. 2 shows an SEM image of the complex transition metal oxide precursor powder prepared in Example 1 using an SEM (Model No. JSM 6400, JEOL, Japan), and FIG. 3 shows an SEM image of the spinel oxide powder prepared in Example 3. These images demonstrate that the particles had a uniform size of 10 µm and a spherical morphology.
(2) XRD
X-ray diffraction patterns were obtained using an X-ray diffraction analyzer (Model No. Rint-2000, Rigaku, Japan). X-ray diffraction images of the spinel oxides $Li_{1.06}[Ni_{0.5}Mn_{1.5}]O_4$ (Examples 1 and 2) and $Li_{1.06}[Ni_{0.5}Mn_{1.5}]O_{4-y}S_y$ (y=0.05) (Examples 3 and 4) prepared at different secondary calcining temperatures of 500° C. and 800° C. are shown in FIGS. 4 and 8. These patterns indicate that the crystallinity of the spinel oxides was improved with increasing calcining temperatures and the amount of impurities was reduced in the spinel oxides partly replaced with sulfur.

Experiment 2 (Evaluation (I) of Characteristics of Batteries)

To evaluate the characteristics of batteries fabricated using the spinel oxide powders prepared in Examples 1 and 3, charge/discharge experiments were conducted using an electrochemical analysis system (Model No. Toscat 3000U, Toyo, Japan) at 30° C. and a current density of 0.2 mA/cm$^2$ in the potential region of 2.4~3.5V. Each of the spinet oxide powders prepared in Examples 1 and 3 as a cathode active material, acetylene black as a conductive agent and polyvinylidene fluoride (PVdF) as a binder were mixed in a weight ratio of 80:10:10 to prepare a slurry. The slurry was uniformly coated to a thickness of 20 µm on an aluminum foil, and dried under vacuum at 120° C. to produce a cathode. A coin-type battery was fabricated by using the cathode, a lithium foil as a counter electrode, a porous polyethylene film (thickness: 25 µm, Celgard 2300, Celgard LLC) as a separator, and a 1M $LiPF_6$ solution in a mixed solvent of ethylene carbonate and diethyl carbonate (1:1 (v/v)) as a liquid electrolyte in accordance with procedures well known in the art.

Figure 5:
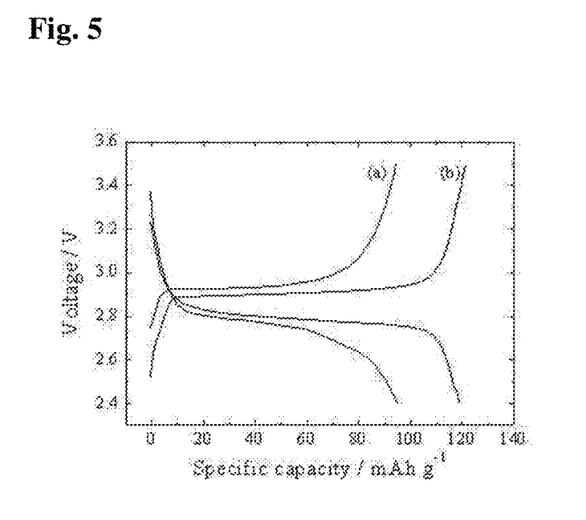
FIG. 5 shows voltage-capacity curves of batteries fabricated using spinel oxides prepared in Examples 1 and 3 in the potential region of 2.4~3.5V.
Figure 9:
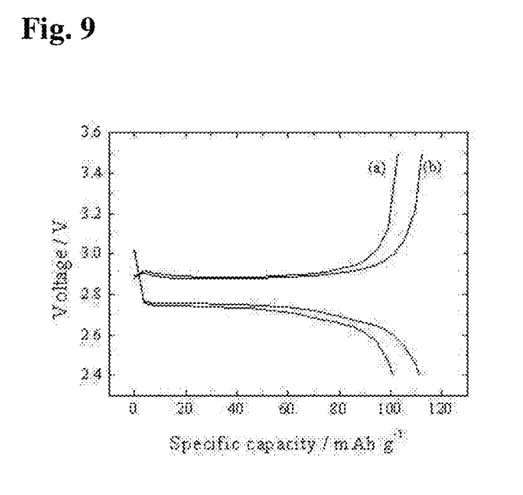
FIG. 9 shows voltage-capacity curves of batteries fabricated using spinel oxides prepared in Examples 2 and 4 in the potential region of 2.4~3.5V.

The characteristics of the spinel oxide powders as cathode active materials in the coin-type batteries were evaluated using an electrochemical analysis system (Toyo System, Toscat 3100U). FIGS. 5 and 9 show voltage-capacity curves of the batteries fabricated using the spinel oxides in which no sulfur was replaced (Examples 1 and 3) and the spinel oxides in which sulfur was partly replaced (Examples 2 and 4) at different secondary calcining temperatures of 500° C. or 800° C. The voltage-capacity curves show that the batteries have a constant potential plateau in the 3V region (2.8V). This indicates that the spinel oxides partly replaced with sulfur show increased discharge capacity. The reason for the increased discharge capacity is a reduction in the amount of impurities, as confirmed from the analytical results of the X-ray diffraction patterns shown in FIGS. 4 and 8.

Figure 6:
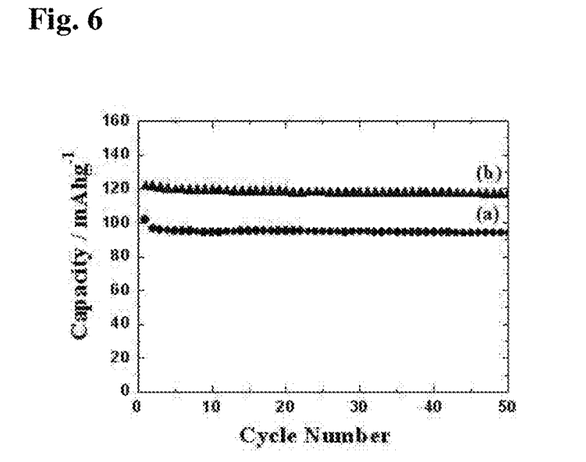
FIG. 6 is a graph showing the relationship between discharge capacity and number of cycles in batteries fabricated using spinel oxides prepared in Examples 1 and 3 in the potential region of 2.4~3.5V.
Figure 10:
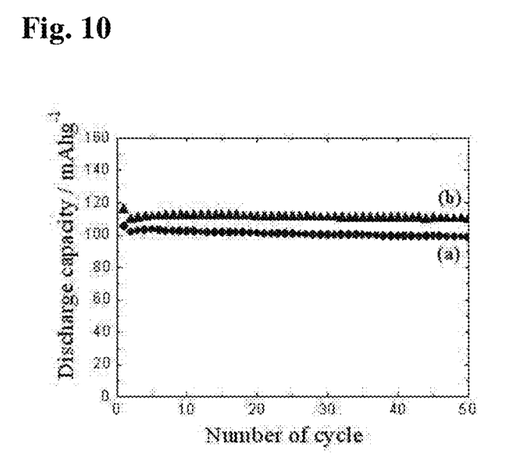
FIG. 10 is a graph showing the relationship between discharge capacity and number of cycles in batteries fabricated using spinel oxides prepared in Examples 2 and 4 in the potential region of 2.4~3.5V.

FIGS. 6 and 10 are graphs showing the relationship between discharge capacity and number of charge/discharge cycles in the batteries fabricated using the spinel oxides prepared in Examples 1 to 4. These graphs reveal that the batteries showed a high discharge capacity of 95% or more of the initial discharge capacity even after 50 charge/discharge cycles, indicating that the batteries showed superior cycle characteristics.

Experiment 3 (Evaluation (II) of Characteristics of Batteries)

Figure 7:
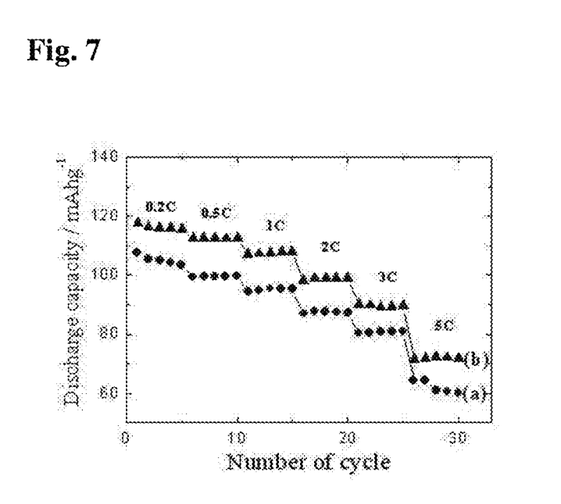
FIG. 7 is a graph showing the relationship between high-rate discharge capacity and number of cycles in batteries fabricated using spinel oxides prepared in Examples 1 and 3 in the potential region of 2.4~3.5V.
Figure 11:
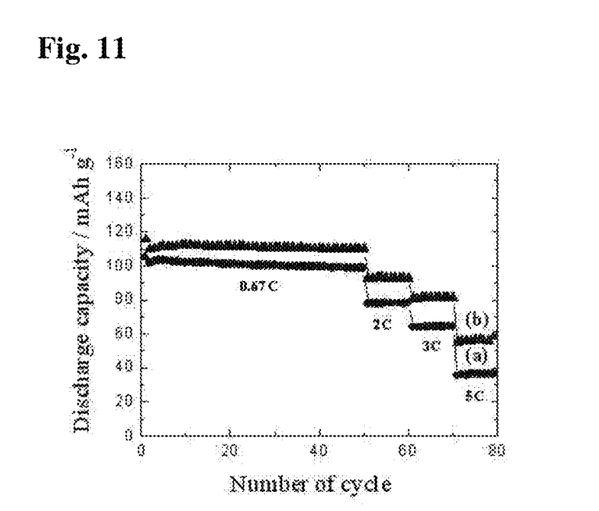
FIG. 11 is a graph showing the relationship between high-rate discharge capacity and number of cycles in batteries fabricated using spinel oxides prepared in Examples 2 and 4 in the potential region of 2.4~3.5V.
Figure 12:
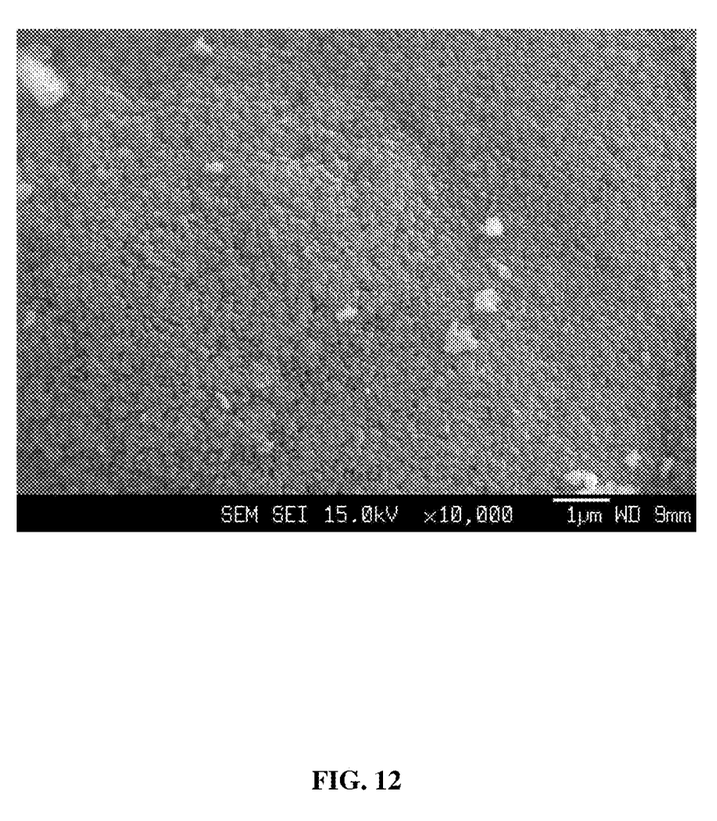
FIG. 12 is a scanning electron microscopy (SEM) image of a 3V class spinel oxide showing primary particle sizes down to 10 nm.

Electrodes were produced by the procedure of Experiment 2, and high-rate discharge was applied until the discharge current density reached 5 C. FIGS. 7 and 11 are graphs showing the relationship between discharge capacity and number of charge/discharge cycles in the batteries fabricated using the spinel oxides prepared in Examples 1 to 4. These graphs reveal that the lithium secondary batteries fabricated using the spinel oxides of the present invention showed a very high high-rate discharge capacity and excellent capacity retention.

The invention claimed is:

1. A method for preparing a 3V class spinel oxide by feeding distilled water purged with carbonic acid gas, an aqueous solution containing at least one transition metal except Mn as a central metal, an aqueous ammonia solution and a carbonate solution into a reactor to prepare a transition metal complex carbonate by carbonate coprecipitation, primarily calcining the transition metal complex carbonate to prepare a transition metal complex oxide, and adding an excess of a lithium salt with respect to the stoichiometric ratio of the transition metal complex oxide, followed by secondary calcining, to prepare $Li_{1+x}[M_yMn_{(2-y)}]O_{4-z}S_z$ ($0 \leq x \leq 0.1$, $0.01 \leq y \leq 0.5$, $0.01 \leq z \leq 0.5$, and M is Mn, Ni or Mg).

2. The method according to claim 1, wherein transition metal is selected from the group consisting of Ni, Mg, Ti, V, Cr, Fe, Co, Cu, Zn, Al, Ga, Rb, Ge, Mo, Nb, Zr, Si, and combinations thereof.

3. The method according to claim 1, wherein the transition metal is in the form of a metal salt selected from nitrates, sulfates, phosphates and chlorides of the transition metal.

4. The method according to claim 1, wherein the primary calcining of the transition metal carbonate and the secondary calcining of the transition metal complex oxide are performed at between 500° C. and 800° C.

5. The method according to claim 1, wherein the carbonate solution is selected from sodium carbonate, ammonium hydrogen carbonate, ammonium carbonate, and sodium hydrogen carbonate solutions.

6. The method according to claim 1, wherein the mixed solution has an acidity (pH) between 4 and 13.

7. The method according to claim 1, wherein 0.01~0.5 moles of sulfur per mole of the transition metal complex oxide is further added before the secondary calcining.

8. The method according to claim 1, wherein the spinel oxide is composed of spherical secondary particles having a particle diameter of 5~20 μm obtained from aggregation of primary particles having a particle diameter of 10~50 nm.

* * * * *